US010990360B2

(12) United States Patent
Gruenewald et al.

(10) Patent No.: US 10,990,360 B2
(45) Date of Patent: Apr. 27, 2021

(54) HOUSE OF QUALITY FOR FEDERATED MANUFACTURING APPS

(71) Applicants: Siemens Aktiengesellschaft, Munich (DE); Georgia Tech Research Corporation, Atlanta, GA (US)

(72) Inventors: Thomas Gruenewald, Somerset, NJ (US); Lingyun Wang, Princeton, NJ (US); Justinian Rosca, West Windsor, NJ (US); Thomas Kurfess, Clemson, NJ (US); Stephanie Locks, Longwood, FL (US); Aoyu Chen, Atlanta, GA (US); Dongmin Han, Atlanta, GA (US); Nuodi Huang, Atlanta, GA (US); Roby Lynn, Atlanta, GA (US)

(73) Assignees: Siemens Aktiengesellschaft, Munich (DE); Georgia Tech Research Corporation, Atlanta, GA (US)

( * ) Notice: Subject to any disclaimer, the term of this patent is extended or adjusted under 35 U.S.C. 154(b) by 27 days.

(21) Appl. No.: 16/340,851

(22) PCT Filed: Sep. 28, 2017

(86) PCT No.: PCT/US2017/053974
§ 371 (c)(1),
(2) Date: Apr. 10, 2019

(87) PCT Pub. No.: WO2018/080714
PCT Pub. Date: May 3, 2018

(65) Prior Publication Data
US 2019/0243618 A1    Aug. 8, 2019

Related U.S. Application Data

(60) Provisional application No. 62/411,840, filed on Oct. 24, 2016.

(51) Int. Cl.
*G06F 8/35* (2018.01)
*G06Q 10/06* (2012.01)
(Continued)

(52) U.S. Cl.
CPC .................. *G06F 8/35* (2013.01); *G06F 8/20* (2013.01); *G06F 40/30* (2020.01); *G06N 20/00* (2019.01); *G06Q 10/06395* (2013.01)

(58) Field of Classification Search
CPC .... G06N 20/00; G06Q 10/06395; G06F 8/35; G06F 8/20; G06F 40/30
(Continued)

(56) References Cited

U.S. PATENT DOCUMENTS 5,278,751 A  *  1/1994  Adiano .................. G06Q 10/06
                                                            705/7.32
2014/0156338 A1    6/2014  Ito et al.
(Continued)

OTHER PUBLICATIONS

Aghdam Mohammad Molani et al: "House of quality improvement by new design requirements generation", 2015 International Conference on Industrial Engineering and Operations Management (IEOM), IEEE, Mar. 3, 2015 (Mar. 3, 2015), pp. 1-9, XP032768288.
(Continued)

*Primary Examiner* — John Q Chavis

(57) ABSTRACT

A computer-implemented method of identifying federations of manufacturing apps using House of Quality (HoQ) analysis includes receiving user request information comprising a plurality of desired functions and an importance value for each of the plurality of desired functions and generating a correlation matrix between the plurality of apps, wherein each element of the correlation matrix indicates a degree of correlation between a pair of apps. A relationship matrix is generated which comprises numerical values indicating relationships between a plurality of apps and the plurality of desired functions, wherein each column of relationship
(Continued)

matrix is associated with an app and each row is associated with a desired function. Next, a weighted matrix is created by multiplying each row in the relationship matrix by the importance value corresponding to the desired function associated with the row. The numerical values in each column of the weighted matrix are aggregated to determine a total value for each of the plurality of apps. A federation of apps is identified based on the correlation matrix and the total values determined for the plurality of apps.

18 Claims, 7 Drawing Sheets

(51) Int. Cl.
*G06F 40/30* (2020.01)
*G06N 20/00* (2019.01)
*G06F 8/20* (2018.01)

(58) Field of Classification Search
USPC .......................................................... 717/104
See application file for complete search history.

(56) References Cited

U.S. PATENT DOCUMENTS

2015/0339572 A1* 11/2015 Achin .................. G06F 9/5011
706/46
2016/0148850 A1* 5/2016 David .................... G06N 7/005
438/5

OTHER PUBLICATIONS

International Search Report dated Mar. 13, 2018; PCT Application No. PCT/US2017/053974; International Filing Date: Sep. 28, 2017; 19 pages.

\* cited by examiner

HOUSE OF QUALITY FOR FEDERATED MANUFACTURING APPS

CROSS-REFERENCE TO RELATED APPLICATIONS

This application is a national phase filing under 35 U.S.C. § 371 of International Patent Application No. PCT/US2017/053974, filed Sep. 28, 2017, which claims the benefit of priority to U.S. Provisional Patent Application Ser. No. 62/411,840, filed Oct. 24, 2016, which are incorporated herein by reference in their entirety.

TECHNICAL FIELD

The present invention relates generally to systems, methods, and apparatuses related to a dynamic house of quality for manufacturing apps. The techniques discussed herein may be used, for example, to provide recommendations of federations of apps based on requirements data and correlations between the functionality provided by a group of apps.

BACKGROUND

Apps are small applications that are easily programmed on the controller to execute simple tasks, much as they function on a smart phone. Individual apps may be developed for applications such as monitoring a sensor output, or taking an action based on a sensor's output. Apps that are manufacturing oriented are called "manufacturing apps." Like mobile apps on smart devices, as this concept becomes more popular, these manufacturing apps for machine controllers will be created and programmed by app developers from all over the world to serve the needs of customers. These app developers can be employees, customers, or even some app hobbyists. More and more people will be involved in the app design, development and download. During this process, huge amount of data/information will be generated from customers, app developers or app users. A good organization of these apps and valuable data/information will provide better understanding of customer desires and greater customer satisfaction. Accordingly, it is desired to provide a tool to guide customer chosen apps, analyze market supply/demand, and work as an organizer for these apps.

One tool for relating customer needs to engineering requirements is the "House of Quality" (HoQ). Briefly, as is understood in the art, the HoQ comprises a matrix with customer requirements on one dimension and correlated product technical requirements on the other dimension. This matrix is commonly referred to as a "relationship matrix." The elements of the relationship matrix are weighted according to the importance of the technical requirements to the customer. A triangular correlation matrix resides at the top of the main body (thus creating the "house"). The correlation matrix describes the relationship between the design features in the relationship matrix. Finally, below the relationship matrix, a lower level (or "foundation") section provides benchmarking and target values which can be used for ranking different options.

The conventional HoQ allows users to analyze customer desires and highlight important engineering requirements; however, some drawbacks limit the practicability and suitability of the conventional HoQ to be used with manufacturing apps. The conventional HoQ is meant to facilitate designing products and it cannot adapt automatically to new customer desires and apps. Also, because each section of the conventional HoQ is fixed, it cannot provide the most up-to-date customer desires in real-time or near real-time. In other words, it doesn't provide information statistically, which is quite important to understand the trend of market.

SUMMARY

Embodiments of the present invention address and overcome one or more of the above shortcomings and drawbacks, by providing methods, systems, and apparatuses related to a dynamic house of quality (the "Dynamic HoQ") for manufacturing apps.

According to some embodiments, a computer-implemented method of identifying federations of manufacturing apps using house of quality (HoQ) analysis includes receiving user request information comprising a plurality of desired functions and an importance value for each of the plurality of desired functions. In some embodiments a requirements document from a user and a natural language processing model is applied to the requirements document to extract the plurality of desired functions and the importance value for each of the plurality of desired functions. A correlation matrix is generated, with each element of the correlation matrix indicating a degree of correlation between a pair of apps. A relationship matrix is generated which comprises numerical values indicating relationships between a plurality of apps and the plurality of desired functions, wherein each column of relationship matrix is associated with an app and each row is associated with a desired function. Next, a weighted matrix is created by multiplying each row in the relationship matrix by the importance value corresponding to the desired function associated with the row. The numerical values in each column of the weighted matrix are aggregated to determine a total value for each of the plurality of apps. A federation of apps is identified based on the correlation matrix and the total values determined for the plurality of apps. Once identified, in some embodiments, each app included in the federation of apps may be automatically installed on a user computing system.

In some embodiments, the correlation matrix used in aforementioned method is generated at least in part by performing a semantic analysis for each app to determine a similarity measure for each of the other apps indicating a degree of similarity with respect to source code information. Then, elements of the correlation matrix between two apps are populated with the similarity measure corresponding to the two apps. In one embodiment, the source code information comprises one or more of class name, function name, variable name, or output values. In other embodiments, the source code information comprises one or more of function block input parameters and function block output parameters.

Various techniques may be used to generate the correlation matrix in the method described above. For example, in some embodiments, the method further comprises analyzing records of app installations to identify combinations of apps previously installed by one or more users. The correlation matrix may then be generated, at least in part, by populating elements of the correlation matrix between the pair of apps with a similarity measure indicating that the pair of apps are both included in two or more of the combinations of apps. In other embodiments, records of app usage are analyzed to identify combinations of apps previously used by one or more users. The correlation matrix may then be generated, at least in part, by populating elements of the correlation matrix between the pair of apps with a similarity measure indicating that the pair of apps are both included in two or more of the combinations of apps.

Similarly, various techniques may be used for generating the relationship matrix used in the aforementioned method. For example, in one embodiment, a machine learning model is applied to each app and each desired function to determine a numerical value indicating a degree of relatedness between the app and the desired function. Then, for each app and each desired function, an element of the relationship matrix corresponding to the app and the desired function is populated with the numerical value indicating the degree of relatedness between the app and the desired function.

In some embodiments of the method described above, a HoQ diagram may be generated to visualize features such as the plurality of desired functions, the importance value for each of the plurality of functions, the correlation matrix, the relationship matrix, and the total values determined for the plurality of apps. Once generated, this diagram can be presented on a display. In one embodiment, a relative weight is determined for each of the total values by dividing each total value by a summation of all of the total values, and the HoQ diagram further comprises a visualization of the relative weight for each of the total values.

In other embodiments of the present invention, a computer-implemented method of identifying recommendations of manufacturing apps using HoQ analysis includes receiving, from a user, user request information comprising a plurality of desired functions and an importance value for each of the plurality of desired functions. A HoQ diagram is generated that comprises (a) a relationship matrix comprising numerical values indicating relationships between the plurality of apps and the plurality of desired functions and (b) a correlation matrix between pairs of the plurality of apps. The HoQ diagram is used to identify one or more app recommendations providing the plurality of desired functions. The one or more app recommendations are presented to the user.

According to another aspect of the present invention, a computer-implemented method of identifying recommendations of manufacturing apps using HoQ analysis includes receiving a plurality of apps from a plurality of app developers and analyzing each of the plurality of apps to determine design features of the plurality of apps. A plurality of desired functions are received from a user and a HoQ diagram is generated that comprises (a) a relationship matrix comprising numerical values indicating relationships between the design features and the plurality of desired functions and (b) a correlation matrix between pairs of the plurality of apps. The HoQ diagram is used to identify one or more app recommendations providing the plurality of desired functions. Then, the one or more app recommendations may be presented to the user. Various enhancements, modifications, or other refinements may be made to this method using techniques similar to those discussed with the other methods discussed above.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

The following disclosure describes the present invention according to several embodiments directed at methods, systems, and apparatuses related to a dynamic house of quality for manufacturing apps (the "Dynamic HoQ"). Briefly, the Dynamic HoQ enhances a traditional HoQ diagram by focusing on apps rather than product features. Each app is able to operate independently and, in the simplest case, a single app may meet all of the customer's requirements. However, the Dynamic HoQ also enables the identification of federations of apps that are able to provide aggregate functionality that meets the customer requirements. The term "federation of apps," as used herein, refers to a plurality of distinct apps that can be used jointly to unify disparate functionality and data in order to perform higher level analysis. The Dynamic HoQ discussed herein may be updated in real-time or near real-time based on statistics indication how customers are using apps within their respective automation systems. This updating can take place on the level of a single organization or a group of organizations. Thus, the Dynamic HoQ helps customers ensure that they are using the optimal set of apps to meet their system requirements. Additionally, app developers can leverage the information provided by the Dynamic HoQ to determine which apps should be created to attract more app users.

Figure 1:
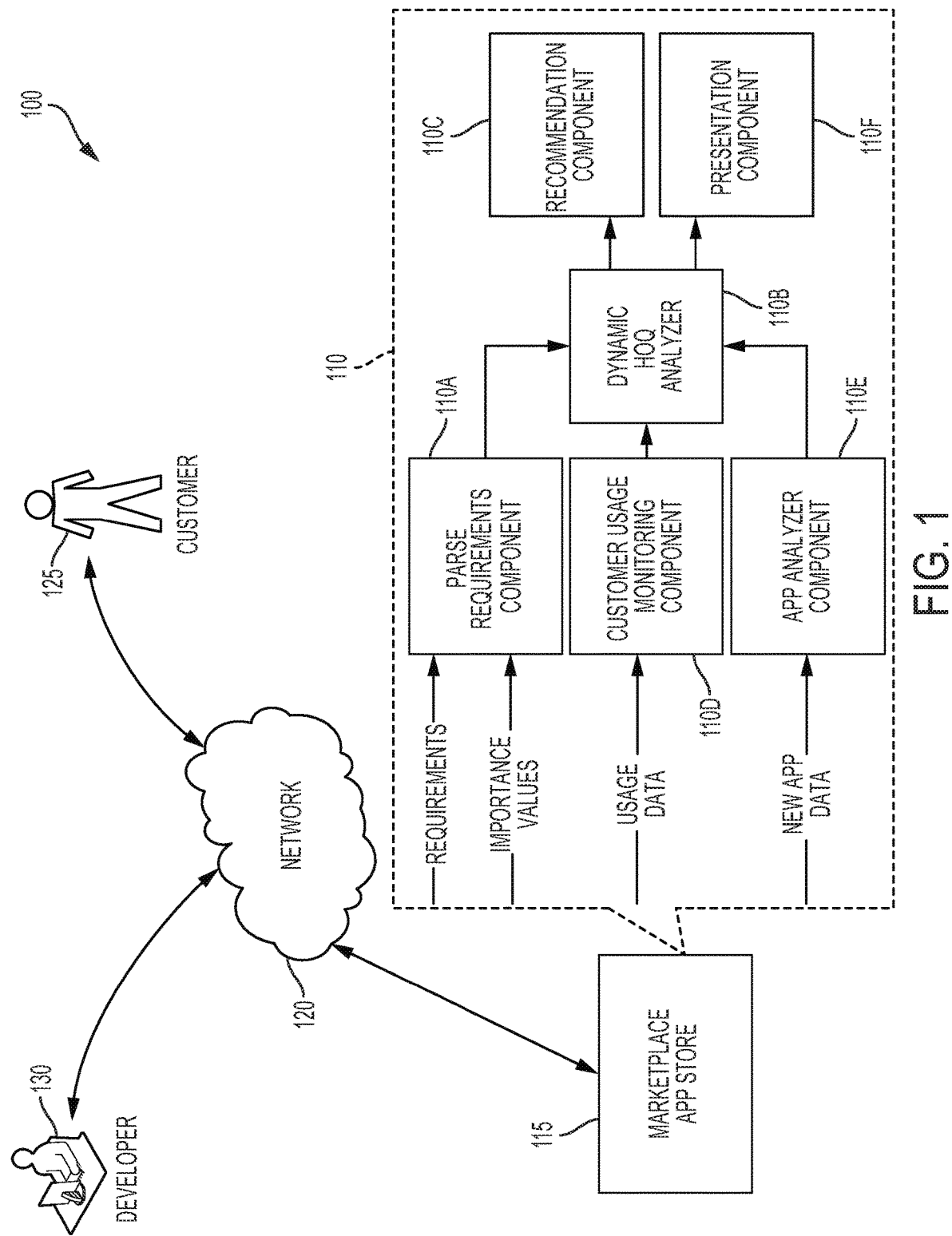
FIG. 1 illustrates a system for generating Dynamic HoQ data, according to some embodiments.

FIG. 1 illustrates a system 100 for generating Dynamic HoQ data, according to some embodiments. Briefly, a Developer 130 and a Customer 125 connect to a Marketplace App Store 115 via a Network 120. The Network 120 may be any network generally known in the art. For example, in some embodiments, the Network 120 is the Internet or an Intranet. The Developer 130 develops apps for use at one or more customer sites. Apps are uploaded by the Developer 130 to the Marketplace App Store 115 via the Network 120. Once uploaded, the Marketplace App Store 115 analyzes the app, or metadata associated with the app, to determine information that can be used to generate or update a Dynamic HoQ diagram. The Customer 125 accesses the Marketplace App Store 115 to perform actions that leverage the Dynamic HoQ diagram (e.g., downloading apps or federation of apps identified based on the Dynamic HoQ diagram). The process involved in generating and using the Dynamic HoQ diagram is described in further detail below.

Within the Marketplace App Store 115, a set of software components 110 are collectively used to generate, maintain, and use the data related to Dynamic HoQ diagrams. It should be noted that the particular configuration of components shown in the example of FIG. 1 are provided for illustration purposes and should not be understood to be limiting. In other embodiments of the present invention, additional components may be added to provide additional functionality. Alternatively, components can be omitted or combined in different embodiments.

A Parse Requirements Component 110A receives requirements data and corresponding importance values from the Customer 125. In some embodiments, the Marketplace App Store 115 may provide Customer 125 with a predetermined list of requirements which can be selected. For example, in one embodiment, the Marketplace App Store 115 provides a graphical user interface (GUI) with dropdown menu items for specifying requirements. In other embodiments, Customer 125 can specify requirements in a more free-form manner and natural language processing, or other machine learning techniques, may be used to derive requirements data. For example, Customer 125 may specify "the app must have the ability to detect spindle crashes and bearing damages." Machine learning may then be used to derive the requirements of "Detect Spindle Crash" and "Detect Bearing Damage." Similar techniques may be used for specifying importance values. In one embodiment, the Parse Requirements Component 110A has functionality for parsing requirement documents generated from Customer 125 to extract text that is relevant to app requirements. This relevant text can be translated into requirements data and corresponding importance values with natural language processing techniques discussed above. Document parsing techniques are generally known in the art and, thus, these techniques are not discussed in detail herein.

Figure 2:
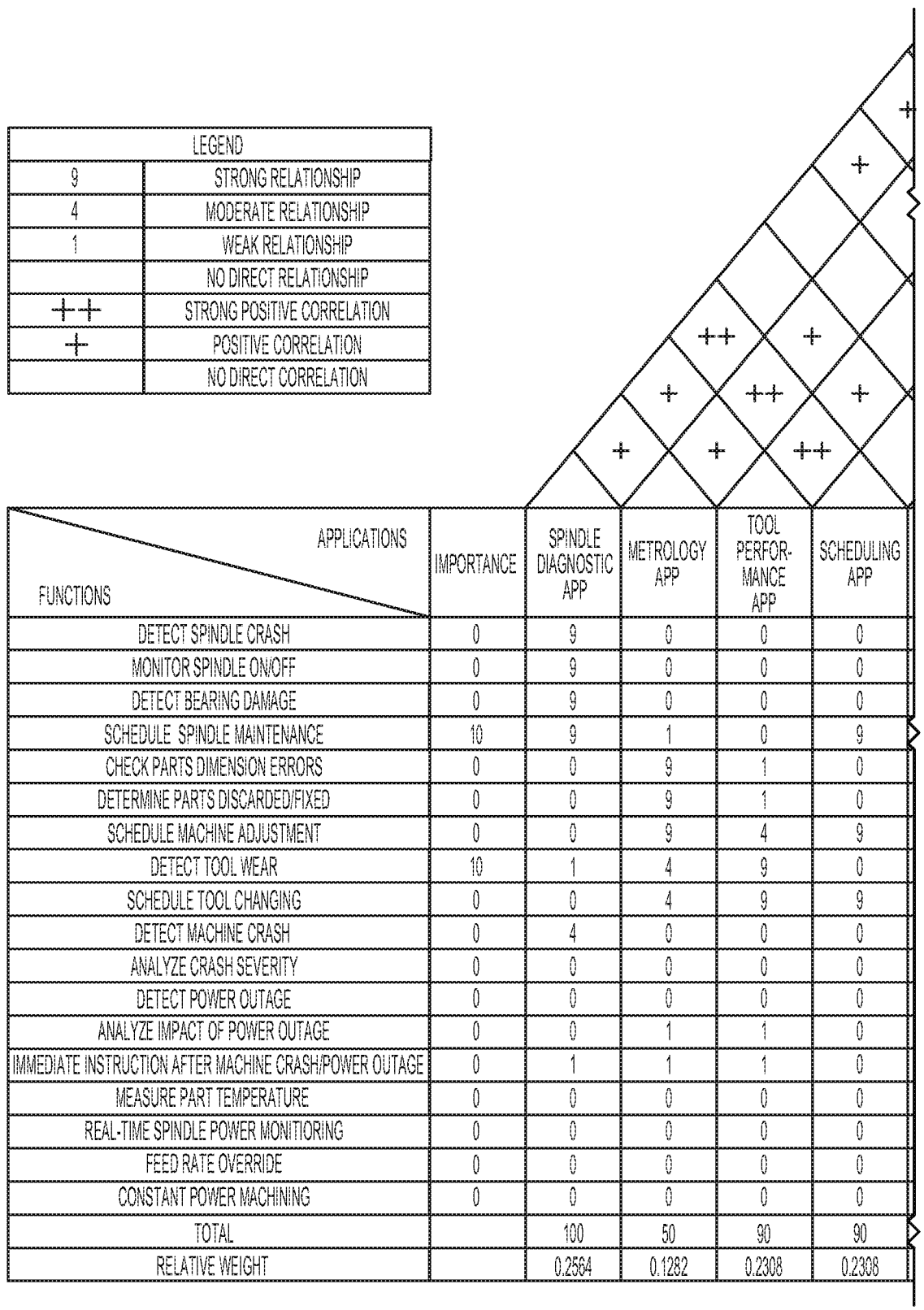
FIG. 2 provides an example of Dynamic HoQ that may be generated using the techniques described herein.
Figure 2:
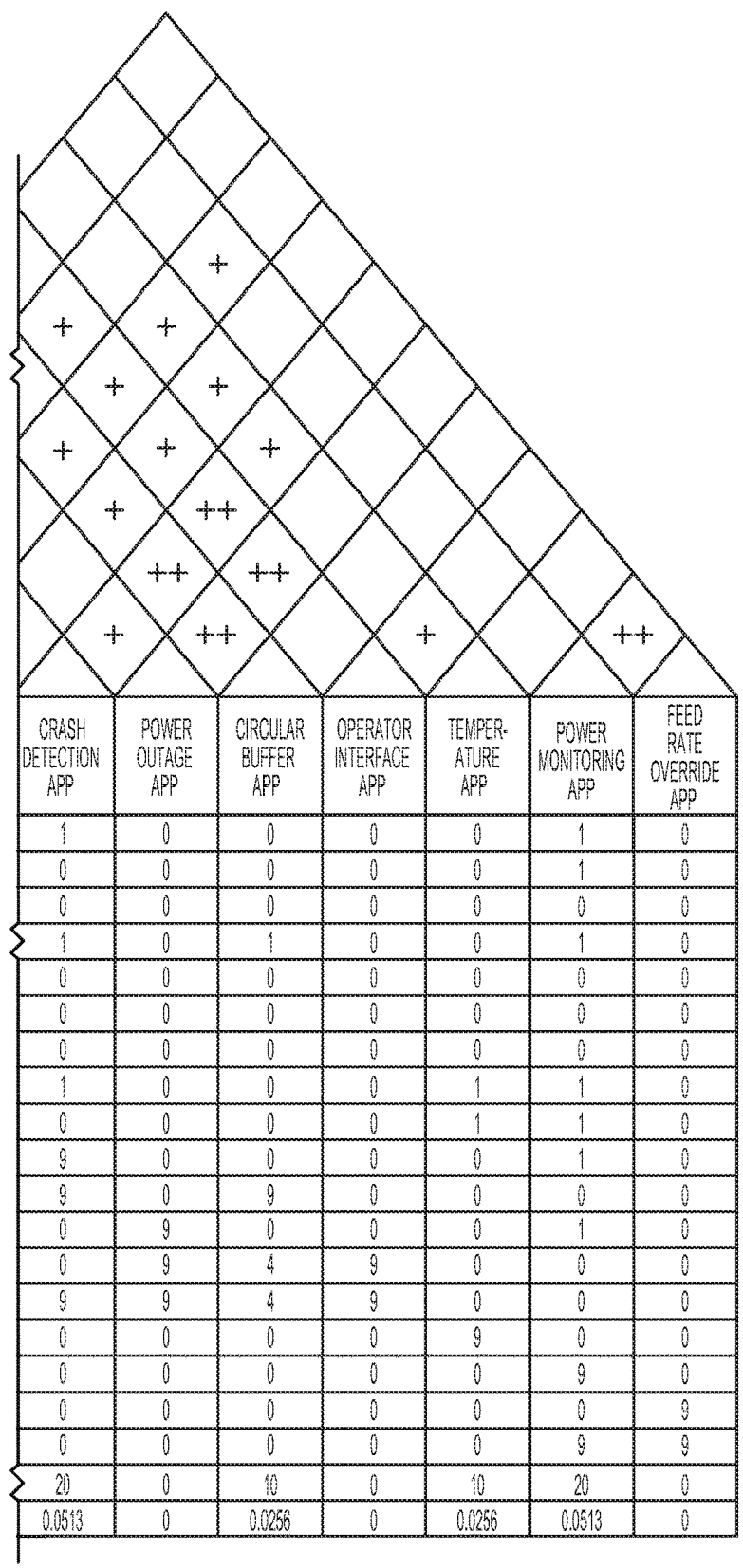

Once the requirements data and corresponding importance values are determined by the Parse Requirements Component 110A, a Dynamic HoQ Analyzer 110B uses these items to either create a new HoQ or to update an existing HoQ. FIG. 2 provides an example of Dynamic HoQ that may be generated using the techniques described herein. The exact components of the Dynamic HoQ are discussed below with respect to FIG. 3. In general, the Dynamic HoQ Diagram looks similar to a traditional HoQ diagram; however, the Dynamic HoQ Diagram includes several additional features that improve its compatibility and suitability with manufacturing apps. Various techniques known in the art may be used for storing the data associated with Dynamic HoQ. For example, in some embodiments, the data is stored as a set of matrices. Each app may have its own matrix that stores numerical information indicating the degree to which a particular app does or does not provide certain functions. For example, with reference to FIG. 2, a matrix may be stored for the Spindle Diagnostic App with the values "9, 9, 9" corresponding to the "Detect Spindle Crash," "Monitor Spindle On/Off," and "Detect Bearing Damage" functions. Each matrix can be generated and stored, for example, when the app is initially uploaded to the Marketplace App Store 115. Alternatively, the matrix may be dynamically generated based on, for example, functions or variables defined within an app or metadata associated with the app. The former implementation provides the advantage of speed during HoQ generation, while the latter implementation is more robust and allows the HoQ to be dynamically generated for any given set of requirements.

Returning to FIG. 1, once the Dynamic HoQ has been generated, it may be used as input to a Recommendation Component 110C. The Recommendation Component 110C generates recommendations for one or more apps that meet the requirements presented by the Customer 125. These recommendations may then be presented, for example, via a webpage displayed by the Marketplace App Store 115. The webpage may provide links to each individual app. For a federation of apps, the Customer 125 may be given the option of performing a bundled installation of each app in the federation. In some embodiments, rather than presenting the recommendations to the Customer 125, the Marketplace App Store 115 may automatically install the recommended apps on a computing system of the Customer 125. To support this functionality, a software application may be installed on the Customer's 125 system that may be remotely called by the Marketplace App Store 115 (e.g., using a RESTful API or remote method invocation).

Aside from generating recommendations for the Customer 125, the Recommendation Component 110C may also develop recommendations for the Developer 130. For example, if the Recommendation Component 110C determines that a large number of customers require a particular function, a particular app, or a particular app federation, the Developer 130 may be provided with a recommendation (e.g., via email or via the Marketplace App Store 115) to develop one or more apps meeting the customer's needs. For example, the Developer may be provided with a list of functions or apps that are currently in high-demand. In some embodiments, the Developer 130 may view a list of apps created by the Developer 130 in the past and be provided with a list of recommendations for creating federations that can meet the customer's needs.

A Presentation Component 110F may be used to display the Dynamic HoQ in a webpage or other GUI. In some embodiments, the displayed Dynamic HoQ is interactive and allows the user to add or remove requirements and adjust importance values. To support this functionality web-based technologies generally known in the art (e.g., JavaScript, jQuery, etc.) may be employed to receive user input and call the Dynamic HoQ Analyzer 110B dynamically to update the Dynamic HoQ.

A Customer Usage Monitoring Component 110D receives data from the Customer 125 indicating how the Customer 125 is using apps. This information may include, for example, a list of apps or combinations of apps that the Customer 125 is using perform certain functions. In some embodiments, the Customer 125 may provide a log file or other data file to the Customer Usage Monitoring Component 110D, for example, via a RESTful API or other upload mechanism. In other embodiments, a software application may execute on the Customer's 125 system to monitor app usage by the Customer 125 and automatically upload the usage data to the Customer Usage Monitoring Component 110D. Such an application may operate as a background process on the Customer's 125 system and make periodic updates to the Customer Usage Monitoring Component 110D. Once the Customer Usage Monitoring Component 110D gathers the usage data, it may be provided to the Dynamic HoQ Analyzer 110B for incorporation in future Dynamic HoQ Diagrams for the Customer 125. In some embodiments, usage data from multiple customers may be gathered and aggregated to glean knowledge from the collective behavior of different organizations. For example, a federation of apps can be identified for a manufacturer based on federations of apps used by other manufacturers with similar system architectures. To protect confidentiality, the usage data may be pre-processed to delete any sensitive information, either prior to upload to the Customer Usage Monitoring Component 110D or, alternatively, such pre-processing may be incorporated into the Customer Usage Monitoring Component 110D.

The App Analyzer Component 110E processes new apps as they are uploaded to the Marketplace App Store 115 by the Developer 130 in order to determine the app functionality. In some embodiments, the functions provided by an app are provided by the Developer 130 when the app is initially uploaded. For example, the Developer 130 may provide a list of functions provided by an app or, alternatively, the list of functions can be automatically extracted from release notes or other documents provided with the app using machine learning techniques.

Figure 3:
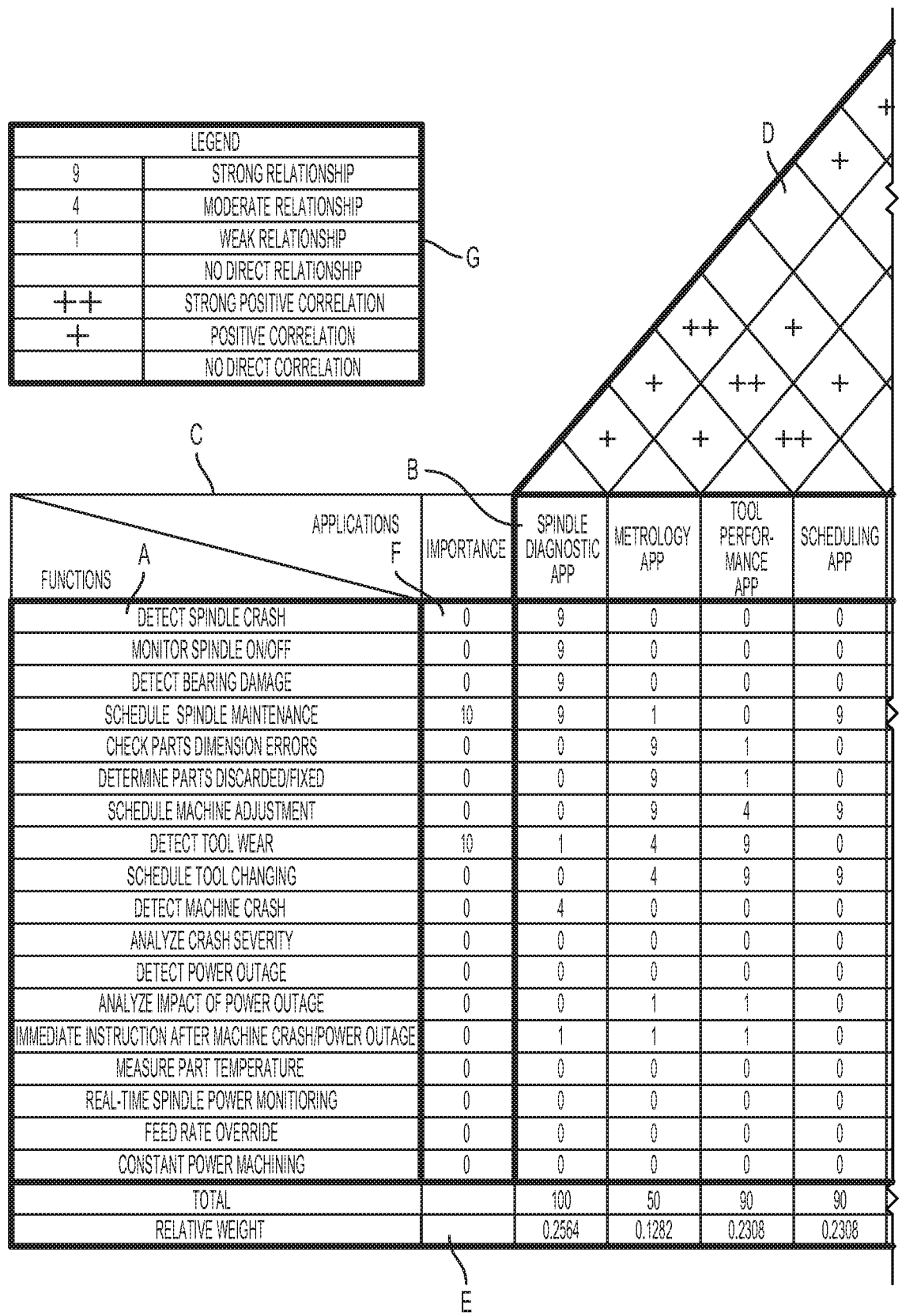
FIG. 3 provides labels for describing the Dynamic HoQ shown in FIG. 2.
Figure 3:
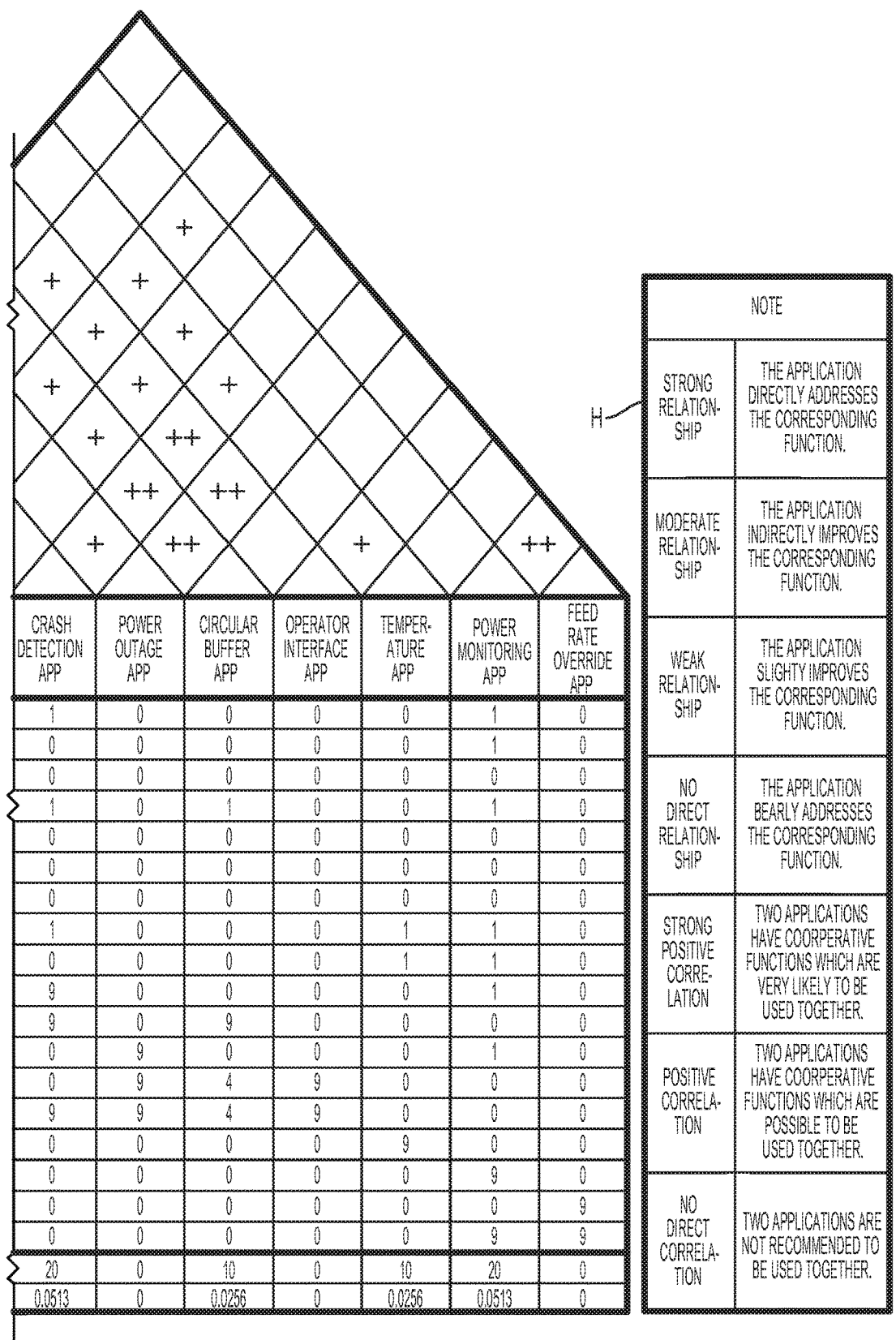

FIG. 3 provides a more detailed view of the Dynamic HoQ Diagram shown in FIG. 2. In FIG. 3, each region is labeled with a letter (A H). Each region is described in greater detail below. The functions in Region A represent needs or desires from customers. Based on their desires, the customers may give different importance values (customer priority) in the column defined as Region F. Larger values indicate higher priority, while smaller values indicate lower priority. These importance values also can be determined based on the statistics from "market" dynamically. For example, if most customers demand the function of "Check Status of Spindle," then this function should have a larger importance value. If a function required by a customer cannot be realized by existing apps, these functions may be saved for future analysis. If a lot of customers desire the same function, the HoQ System may provide a notice to one or more developers that a new app should be created to serve this desire.

Apps are typically very simple programs that provide a limited functionality. They may be combined or used in conjunction with each other to form a federation of apps that are capable of executing a much more complex set of functions. These Apps can be the apps that currently exist or need to be developed. In the example shown in FIG. 3, the "Temperature App" may not currently exist; however, according to the importance value in region F and the value in the relationship matrix region C, the priority to create this non-existent app will be clearly shown in region E. If the priority is high enough, the developer can create the Temperature App to attract more app users. The customers will also benefit from these new apps.

Region C in FIG. 3 includes the relationship matrix. The values in this matrix represent the relationship between the apps and functions. For example, a value of "9" indicates that the Spindle Diagnostics App is highly related to the function of Detect Spindle Crash. In other words, the Spindle Diagnostics App is necessary to achieve the function of Detect Spindle Crash. A value of "1" indicates the Crash Detection App is weakly related to the function of "Detect Machine Crash," because the purpose of the Crash Detect App is to detect crash for the whole machine, not only for spindle crash. Thus, the Crash Detection App can only help improve the result of the Spindle Diagnostics App but cannot replace it.

Region D in FIG. 3 is the correlation matrix that shows the relationship between different apps. The symbol "++" indicates that two apps have a very strong relationship (i.e., users of one app usually use it together with the other app). For example, the Scheduling App is created to work with the Spindle Diagnostics App to schedule spindle maintenance. Therefore, the relationship between these two apps is "++," which means that these two apps are highly recommended to be used in a federation to have the function of "scheduling". Conversely, the symbol "+" indicates that these two apps have weak relationship. For example, the independence between the Metrology App and the Tool Performance App is strong, but they can also be used in a federation to determine whether an out-of-specification part is caused by tool wear. Therefore, the relationship between these two apps is "+." Blank means the federation of these two apps does not provide any useful information in addition. The relationship between the apps can be initially determined by the developers when they created these new apps, but it can also be updated statistically according to how customers use these apps. For example, if many customers use app A and B together, the HoQ System may designate the relationship between A and B as "++."

If the values in Region F are multiplied by the values in Region C and the results are added together for each column, the total of each app will be displayed at the bottom of FIG. 3 diagram in Region E. A relative weight for each app may be determined by dividing the total for a particular app by the summation of the totals for all apps. A larger relative weight for an app indicates that the app plays a more important role in realizing the functions desired by customers. If the value in Region E is zero or the value is much smaller than the values in the other columns, this may be interpreted as indicating that there is little or no relationship between the app and the functions selected by the customer. FIG. 3 also includes explanatory material in Regions G and H. More specifically, Region G includes a legend that explains the meaning of different signs and values in the HoQ diagram. Region H explains and regulates how to specify signs and values in this diagram.

The following several paragraphs describe three applications that provide advantages over existing systems. These examples are merely for illustrative purposes and should not be viewed as limiting of any of the features of the present invention.

Users of smartphones and tablet devices can type in the app they want and download them from an app store. Apps work individually rather than in a federation. With the Dynamic HoQ, users of a particular automation device (e.g., controller) can input their multiple desired functions with importance values and get the recommended apps/app federations they desire. This method is more suitable than current app stores to manage manufacturing apps due to the more complicated functions (federation of apps) required by industry. In this scenario, the Dynamic HoQ diagram becomes a good guide for customers to choose apps and form an app federation to leverage individual functionality of each app. For example, as shown in FIG. 3, if functions "Schedule Spindle Maintenance" and "Detect Tool Wear" are required by a customer and both of them are very important, two "10"s will be filled in the importance column as shown in FIG. 3. Other cells within the importance column will be filled with zeros. If the importance values are multiplied by the relationship matrix and the results are added together for each column, the weight of each app will be displayed at the bottom of this diagram. In this case, the Spindle Diagnostics App, Tool Performance App and Scheduling App will be selected to form a federation due to the high weights values 0.256 and 0.231. Another reason to choose these apps is because they all have the value "9" in the relationship matrix for the two required functions. The Metrology App has the weight value 0.128 but there is no "9" related to the two required functions, so this app is not necessary but it will help improve the function if it is added to the federation. For example, the Metrology App is able to help confirm the result of the Tool Performance App. For the other apps with low weights, they won't contribute much to the required functions, so they will not be selected.

As a second example, the Dynamic HoQ techniques may be applied to enable a supply and demand analyzer. Customer desires are usually difficult to guess but there are some good ways to keep track of them using the Dynamic HoQ diagram. In the first use case of the Dynamic HoQ, the customers can input their desired functions and find the apps they want. If they cannot find an existing app that serves their desires, their inputs are also valuable, because these inputs provide important information about customer demands. To achieve this goal, desired functions input by customers should be recorded, and the importance column will be updated statistically rather than being specified by the customer as in the first use case. For example, if the function of "Measure part temperature" is required by more than 20% of the customers, the value in the importance column for that function will be relatively large compared with other functions. Accordingly, the weight value for the "Temperature App" will become larger than other apps. Therefore, the app developers will know that the "Temperature App" has the highest priority to be created to attract more app users.

On the other hand, HoQ can provide indirect demand information of the market. For example, if 90% of the customers need functions A+B+C, and 75% customers need functions B+C+D, without the Dynamic HoQ, it is difficult to see if there is any relationship between functions A and D. However, there may be a potential large market for a product that combines function A and D. Therefore, Dynamic HoQ has the capability to clearly show the complicated relationships between different functions. This property will encourage innovation and facilitate companies finding potential promising markets. Customers will also benefit from this because the apps are quickly created and updated according to their desires. In this use case, all the apps in the Dynamic HoQ diagram may be non-existent apps. For existing apps, app developers will also be able to know which apps are welcomed and thus focus on improving those apps.

As a third use case, the Dynamic HoQ can be used as a way of organizing apps. Apps can be seen as products sold in a store. If the store becomes very popular among customers, tons of apps will be created or downloaded by apps writers/users. These apps need to be sorted and organized very well, otherwise the customers may not be able to find the most satisfactory app they desire. Thus, it is challenging to organize these apps in an efficient manner. The Dynamic HoQ can be a potential solution. Online retailers often have very good organization for the products they sell. By recording the customer's browsing and payment history, the retailer understands customer desires better and it also provides some recommendations as "frequently bought together" when a searching operation is performed for certain items. A similar strategy can be used to organize apps in the app store or in the Dynamic HoQ diagram itself. As the result, the customers will be able to know which apps should be used together as a federation.

When a new app is created by the app developer, the developer may not know how this new app can form a federation with the apps created by other app developers. However, records of app installation or usage by users can help the developer determine which apps should be used together. In other words, the roof of the HoQ in FIG. 3 (i.e., Region D) will be updated statistically based on how app users federate these apps. For example, if the Circular Buffer App and the Feed Rate Override App are created by two different app developers, the relationship between these two apps should be "blank" initially. After these apps are published, users may find that the feed rate value in the Circular Buffer App can help set the maximum feed rate in the Feed Rate Override App, so that more than 50% of the users will use these two apps together. Then, the relationship between these two apps will be updated to "++." Then, when a user downloads the Feed Rate Override App, the Circular Buffer App will be recommended. In this way, the relationship between different apps can be reorganized using the Dynamic HoQ. New apps also can be easily integrated into this diagram by adding app columns, function rows and filling in the relationship matrix.

Figure 4:
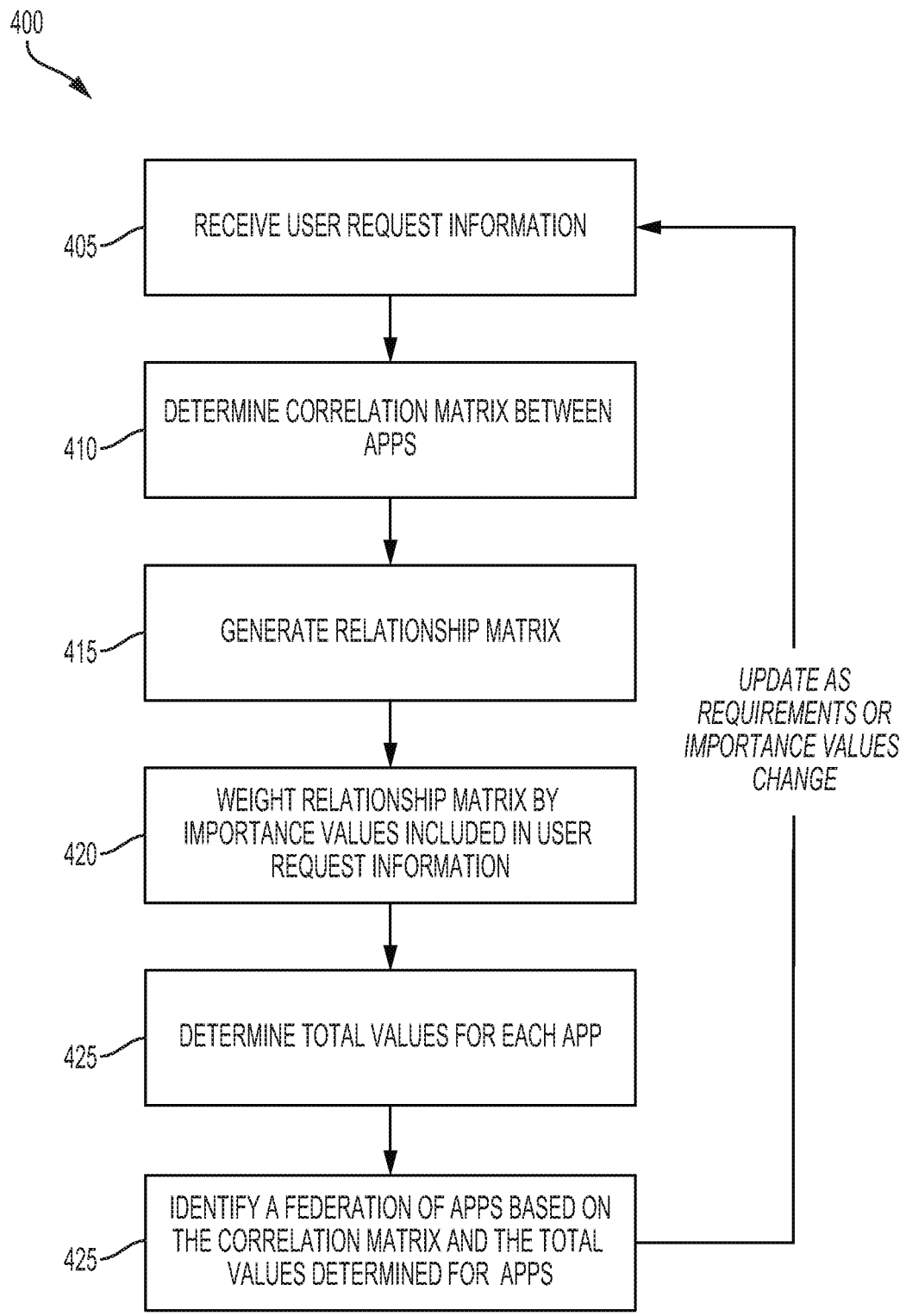
FIG. 4 describes a method of identifying federations of manufacture.

To illustrate one application of the Dynamic HoQ in detail, FIG. 4 describes a method 400 of identifying federations of manufacturing apps using HoQ analysis, according to some embodiments of the present invention. The method 400 may be implemented, for example, on the computer system that hosts the app store. As another example, the method 400 may be implemented on a parallel processing platform to allow for fast computation of the Dynamic HoQ.

The method starts at step 405, where the computing system implementing the method 400 receives user request information comprising a plurality of desired functions and an importance value for each of desired functions. Generally any format known in the art may be used for transmitting the user request information between the user's computer and the computing system. In some embodiments, the user directly inputs the information in a GUI (e.g., app store webpage), while in other embodiments, the user provides one or more files with the user request information. Also, as noted above, in some embodiments the user may provide requirement documents or other technical documents which can then be parsed using training natural language processing models to extract the user request information.

Next at step 410, the computing system generates a correlation matrix between apps. Each element of the correlation matrix indicates a degree of correlation between two apps (see Region D in FIG. 3). Various techniques may be used for determining the correlation matrix. For example, in one embodiment, a semantic analysis is performed for each app to determine a similarity measure for each of the other apps indicating a degree of similarity with respect to source code information. This similarity measure may be, for example, a simple numerical value between 0 (indicating no similarity) and 10 (indicating a high degree of similarity or equivalence). The elements of the correlation matrix between each pair of apps may then be populated with the similarity measure corresponding to the two apps. The exact form of semantic analysis performed on the source code to determine the similarity measure can vary, depending on the type of app being analyzed. For example, in one embodiment, the source code information comprises one or more of class names, function names, or variable names used by an app. Alternatively (or additionally), the source code information analyzed may include interface parameters (e.g., function block input parameters and function block output parameters).

Aside from semantic analysis of each app, the correlational matrix may be generated based on records of app installations. These records can be analyzed by the computing system to identify combinations of apps previously installed by one or more users. Pairs of apps that are typically installed together may be given a relatively high similarity measure, while pairs never installed together may be given a low similarity measure. For example, the number of common installations can be scaled between two numerical values (e.g., 0 and 10) to provide a similarity measure. This concept may be applied to records of app usage as well, if such records are available to the computer system. That is, by analyzing records of app usage the computing system can identify combinations of apps previously used by one or more users. These techniques for measuring similarity based on app installation or usage may be used as an alternative to, in conjunction with, the semantic analysis techniques discussed above.

Continuing with reference to FIG. 4, at step 415, the computing system generates a relationship matrix comprising numerical values indicating relationships between apps and desired functions. One dimension of relationship matrix (e.g., each column) is associated with an app and another dimension (e.g., each row) is associated with a desired function. One example configuration of the relationship matrix is shown in Region C of FIGS. 3A and 3B. In some embodiments, the relationship matrix is generated by applying a deep learning network or other machine learning model to each app and each desired function to determine a numerical value indicating a degree of relatedness between the app and the desired function. Then, these numerical values are used to populate the relationship matrix at the location corresponding to each app/desired function combination. A machine learning model suitable to generate the relationship matrix may be trained based on, for example, a functional description of an app provided by developers when the app is uploaded to the app store. Alternatively, the machine learning model may perform a semantic analysis of the desired function and app. For example, an app that mentions key terms related to the desired functions in function names, variable names, etc. may be designated as being highly related.

Next, at step 420, the computing system creates a weighted matrix by multiplying each column in the relationship matrix by the importance value corresponding to the desired function associated with the row. Then, at step 425, the computing system aggregates the numerical values in each column of the weighted matrix to determine a total value for each of apps. This total value is illustrated in Region E of FIG. 3. It should be noted that use of matrices for managing data should not be viewed as limiting. Thus, in other embodiments of the present invention, other data structures may be used for data management (e.g., graph-based structures).

At step 430, the computing system identifies a federation of apps based on the correlation matrix and the total values determined for apps. Once identified, the federation of apps may be presented to the user, for example, via the app store interface with links enabling the download of the apps comprising the federation. In some embodiments, the federation is automatically installed on the user's computer. As noted above, an application may be installed on the user's machine to allow administrative access to the machines on which the apps will be installed. In this way, the process of app installation can be wholly automated.

As an alternative to identifying a federation of apps, following step 425, a HoQ diagram may be generated and presented to the user or other entities (e.g., the developer). This HoQ diagram may be similar to the one shown in FIGS. 3A and 3B, comprising a visualization of the desired functions, the importance value for each of functions, the correlation matrix, the relationship matrix, and the total values determined for the apps. Additionally, a relative weight may be determined for each of the total values by dividing each total value by a summation of all of the total values. The HoQ diagram further comprises a visualization of the relative weight for each of the total values.

Figure 5:
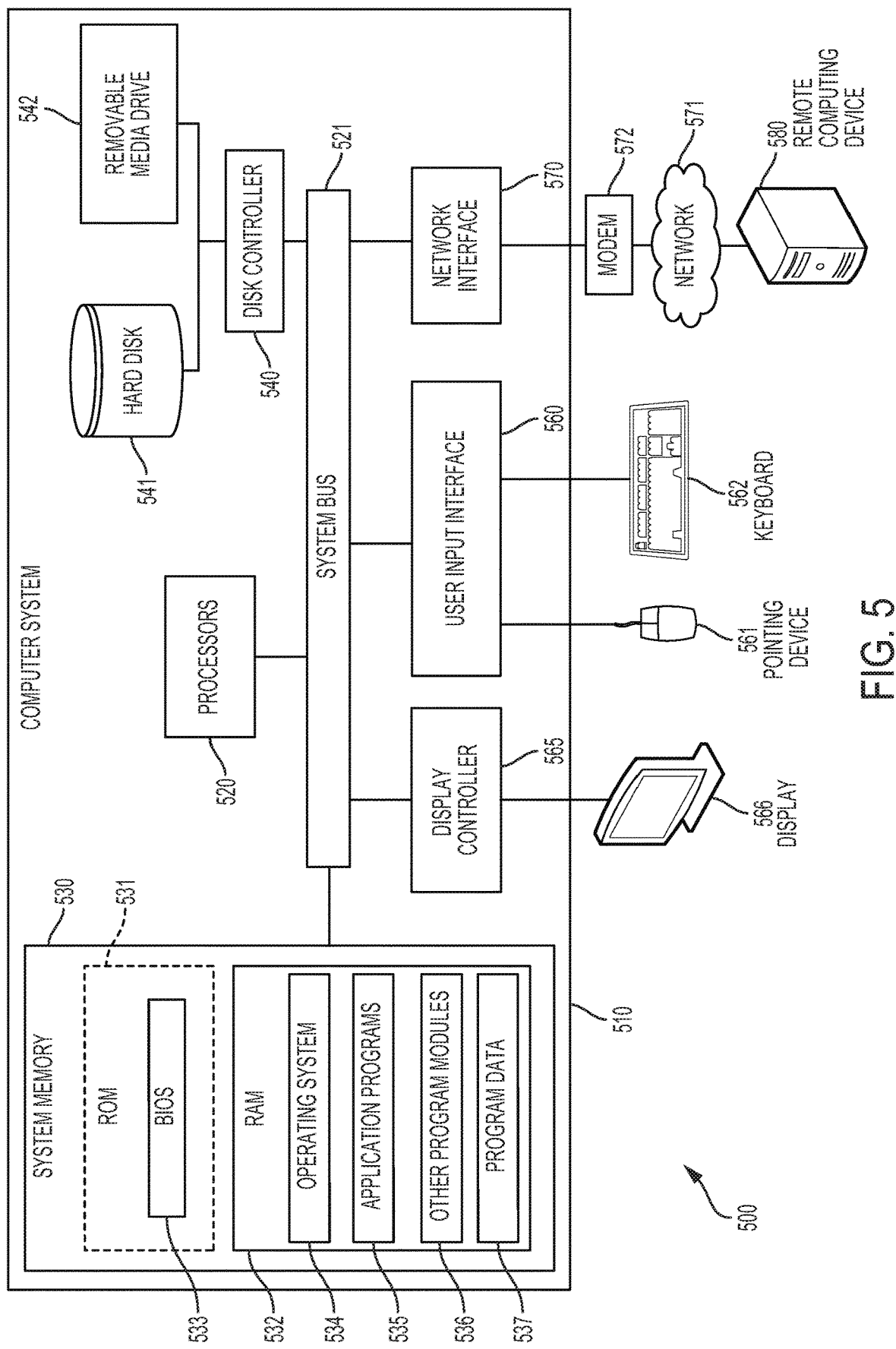
FIG. 5 illustrates an exemplary computing environment within which embodiments of the invention may be implemented.

FIG. 5 illustrates an exemplary computing environment 500 within which embodiments of the invention may be implemented. For example, the computing environment 500 may be used to implement the Marketplace App Store 115 illustrated in the system 100 of FIG. 1. The computing environment 500 includes computer system 510, which is one example of a computing system upon which embodiments of the invention may be implemented. Computers and computing environments, such as computer system 510 and computing environment 500, are known to those of skill in the art and thus are described briefly herein.

As shown in FIG. 5, the computer system 510 may include a communication mechanism such as a bus 521 or other communication mechanism for communicating information within the computer system 510. The computer system 510 further includes one or more processors 520 coupled with the bus 521 for processing the information. The processors 520 may include one or more central processing units (CPUs), graphical processing units (GPUs), or any other processor known in the art.

The computer system 510 also includes a system memory 530 coupled to the bus 521 for storing information and instructions to be executed by processors 520. The system memory 530 may include computer readable storage media in the form of volatile and/or nonvolatile memory, such as read only memory (ROM) 531 and/or random access memory (RAM) 532. The system memory RAM 532 may include other dynamic storage device(s) (e.g., dynamic RAM, static RAM, and synchronous DRAM). The system memory ROM 531 may include other static storage device(s) (e.g., programmable ROM, erasable PROM, and electrically erasable PROM). In addition, the system memory 530 may be used for storing temporary variables or other intermediate information during the execution of instructions by the processors 520. A basic input/output system (BIOS) 533 containing the basic routines that help to transfer information between elements within computer system 510, such as during start-up, may be stored in ROM 531. RAM 532 may contain data and/or program modules that are immediately accessible to and/or presently being operated on by the processors 520. System memory 530 may additionally include, for example, operating system 534, application programs 535, other program modules 536 and program data 537.

The computer system 510 also includes a disk controller 540 coupled to the bus 521 to control one or more storage devices for storing information and instructions, such as a hard disk 541 and a removable media drive 542 (e.g., floppy disk drive, compact disc drive, tape drive, and/or solid state drive). The storage devices may be added to the computer system 510 using an appropriate device interface (e.g., a small computer system interface (SCSI), integrated device electronics (IDE), Universal Serial Bus (USB), or FireWire).

The computer system 510 may also include a display controller 565 coupled to the bus 521 to control a display 566, such as a cathode ray tube (CRT) or liquid crystal display (LCD), for displaying information to a computer user. The computer system includes an input interface 560 and one or more input devices, such as a keyboard 562 and a pointing device 561, for interacting with a computer user and providing information to the processors 520. The pointing device 561, for example, may be a mouse, a trackball, or a pointing stick for communicating direction information and command selections to the processors 520 and for controlling cursor movement on the display 566. The display 566 may provide a touch screen interface which allows input to supplement or replace the communication of direction information and command selections by the pointing device 561.

The computer system 510 may perform a portion or all of the processing steps of embodiments of the invention in response to the processors 520 executing one or more sequences of one or more instructions contained in a memory, such as the system memory 530. Such instructions may be read into the system memory 530 from another computer readable medium, such as a hard disk 541 or a removable media drive 542. The hard disk 541 may contain one or more datastores and data files used by embodiments of the present invention. Datastore contents and data files may be encrypted to improve security. The processors 520 may also be employed in a multi-processing arrangement to execute the one or more sequences of instructions contained in system memory 530. In alternative embodiments, hard-wired circuitry may be used in place of or in combination with software instructions. Thus, embodiments are not limited to any specific combination of hardware circuitry and software.

As stated above, the computer system 510 may include at least one computer readable medium or memory for holding instructions programmed according to embodiments of the invention and for containing data structures, tables, records, or other data described herein. The term "computer readable medium" as used herein refers to any medium that participates in providing instructions to the processor 520 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 541 or removable media drive 542. Non-limiting examples of volatile media include dynamic memory, such as system memory 530. Non-limiting examples of transmission media include coaxial cables, copper wire, and fiber optics, including the wires that make up the bus 521. Transmission media may also take the form of acoustic or light waves, such as those generated during radio wave and infrared data communications.

The computing environment 500 may further include the computer system 510 operating in a networked environment using logical connections to one or more remote computers, such as remote computer 580. Remote computer 580 may be a personal computer (laptop or desktop), a mobile device, a server, a router, a network PC, a peer device or other common network node, and typically includes many or all of the elements described above relative to computer system 510. When used in a networking environment, computer system 510 may include modem 572 for establishing communications over a network 571, such as the Internet. Modem 572 may be connected to bus 521 via user network interface 570, or via another appropriate mechanism.

Network 571 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 510 and other computers (e.g., remote computer 580). The network 571 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 571.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. A computer-implemented method of identifying federations of manufacturing apps using house of quality (HoQ) analysis, the method comprising:
   receiving user request information comprising a plurality of desired functions and an importance value for each of the plurality of desired functions;
   generating a correlation matrix between the plurality of apps, wherein each element of the correlation matrix indicates a degree of correlation between a pair of apps, wherein the correlation matrix is generated at least in part by:
      for each app, performing a semantic analysis to determine a similarity measure for each of the other apps indicating a degree of similarity with respect to source code information; and
      populating elements of the correlation matrix between two apps with the similarity measure corresponding to the two apps;
   generating a relationship matrix comprising numerical values indicating relationships between a plurality of apps and the plurality of desired functions, wherein each column of the relationship matrix is associated with an app and each row is associated with a desired function;
   creating a weighted matrix by multiplying each row in the relationship matrix by the importance value corresponding to the desired function associated with the row;
   aggregating the numerical values in each column of the weighted matrix to determine a total value for each of the plurality of apps; and
   identifying a federation of apps based on the correlation matrix and the total values determined for the plurality of apps.

2. The method of claim 1, wherein the source code information comprises one or more of class name, function name, variable name, or output values.

3. The method of claim 1, wherein the source code information comprises one or more of function block input parameters and function block output parameters.

4. The method of claim 1, wherein the method further comprises:
   analyzing records of app installations to identify combinations of apps previously installed by one or more users,
   wherein the correlation matrix is generated, at least in part, by populating elements of the correlation matrix between the pair of apps with a similarity measure indicating that the pair of apps are both included in two or more of the combinations of apps.

5. The method of claim 1, wherein the method further comprises:
   analyzing records of app usage to identify combinations of apps previously used by one or more users,
   wherein the correlation matrix is generated, at least in part, by populating elements of the correlation matrix between the pair of apps with a similarity measure indicating that the pair of apps are both included in two or more of the combinations of apps.

6. The method of claim 1, wherein the relationship matrix is generated at least in part by:
   applying a machine learning model to each app and the each desired function to determine a numerical value indicating a degree of relatedness between the app and the desired function; and
   for each app and each desired function, populating an element of the relationship matrix corresponding to the app and the desired function with the numerical value indicating the degree of relatedness between the app and the desired function.

7. The method of claim 1, further comprising:
   generating a HoQ diagram comprising a visualization of:
      the plurality of desired functions,
      the importance value for each of the plurality of functions,
      the correlation matrix,
      the relationship matrix, and
      the total values determined for the plurality of apps; and
   presenting the HoQ diagram on at least one display.

8. The method of claim 7, further comprising:
   determining a relative weight for each of the total values by dividing each total value by a summation of all of the total values,
   wherein the HoQ diagram further comprises a visualization of the relative weight for each of the total values.

9. The method of claim 1, wherein receiving the user request information comprises:
   receiving a requirements document from a user;
   applying a natural language processing model to the requirements document to extract the plurality of desired functions and the importance value for each of the plurality of desired functions.

10. The method of claim 9, further comprising:
    automatically installing each app included in the federation of apps on a user computing system.

11. A computer-implemented method of identifying recommendations of manufacturing apps using house of quality (HoQ) analysis, the method comprising:
    receiving, from a user, user request information comprising a plurality of desired functions and an importance value for each of the plurality of desired functions;
    generating a HoQ diagram comprising (a) a relationship matrix comprising numerical values indicating relationships between the plurality of apps and the plurality of desired functions and (b) a correlation matrix between pairs of the plurality of apps, wherein the correlation matrix is generated at least in part by:
       for each app, performing a semantic analysis to determine a similarity measure for each of the other apps indicating a degree of similarity with respect to source code information; and
       populating elements of the correlation matrix between two apps with the similarity measure corresponding to the two apps;
    using the HoQ diagram to identify one or more app recommendations providing the plurality of desired functions; and
    presenting the one or more app recommendations to the user.

12. The method of claim 11, wherein the source code information comprises one or more of class name, function name, or variable name.

13. The method of claim 11, wherein the source code information comprises one or more of function block input parameters and function block output parameters.

14. The method of claim 11, wherein the method further comprises:
    analyzing records of app installations to identify combinations of apps previously installed by one or more users, wherein the correlation matrix is determined, at least in part, by populating elements of the correlation matrix between two apps with a similarity measure indicating that the two apps are both included in two or more of the combinations of apps.

15. The method of claim 11, wherein the method further comprises:
analyzing records of app usage to identify combinations of apps previously used by one or more users,
wherein the correlation matrix is determined, at least in part, by populating elements of the correlation matrix between two apps with a similarity measure indicating that the two apps are both included in two or more of the combinations of apps.

16. The method of claim 11, wherein receiving the user request information comprises:
receiving a requirements document from a user;
applying a natural language processing model to the requirements document to extract the plurality of desired functions and the importance value for each of the plurality of desired functions.

17. The method of claim 16, further comprising:
automatically installing each app included in the app recommendations on a user computing system.

18. A computer-implemented method of identifying recommendations of manufacturing apps using house of quality (HoQ) analysis, the method comprising:
receiving, from a plurality of app developers, a plurality of apps;
analyzing each of the plurality of apps to determine design features of the plurality of apps;
receiving, from a user, a plurality of desired functions;
generating a HoQ diagram comprising (a) a relationship matrix comprising numerical values indicating relationships between the design features and the plurality of desired functions and (b) a correlation matrix between pairs of the plurality of apps, wherein the correlation matrix is generated at least in part by:
for each app, performing a semantic analysis to determine a similarity measure for each of the other apps indicating a degree of similarity with respect to source code information; and
populating elements of the correlation matrix between two apps with the similarity measure corresponding to the two apps;
using the HoQ diagram to identify one or more app recommendations providing the plurality of desired functions; and
presenting the one or more app recommendations to the user.

* * * * *